Aug. 21, 1934.    EL ROY L. PAYNE    1,970,942
THERMOSTAT CONTROL
Filed Jan. 3, 1933    2 Sheets-Sheet 1
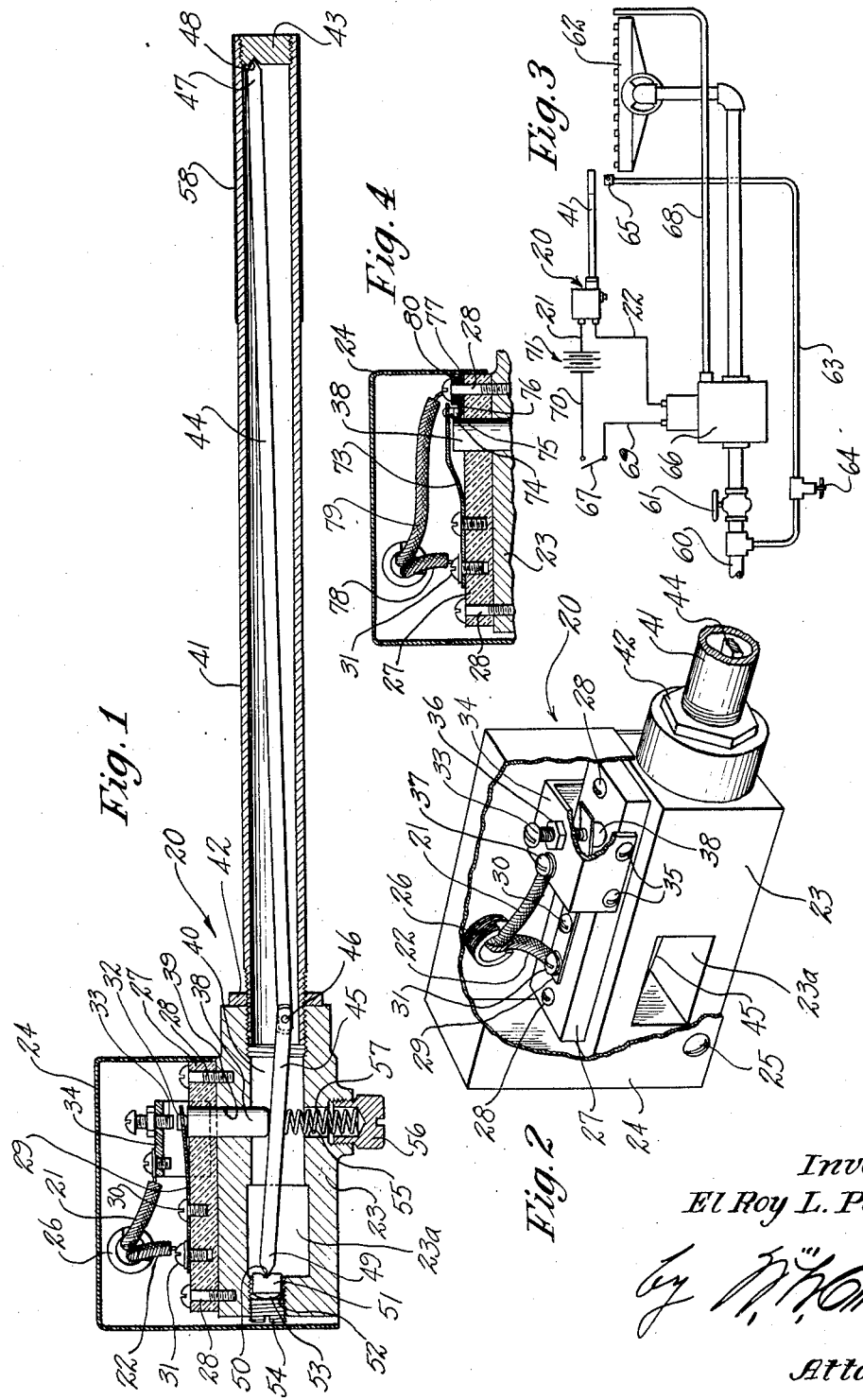
Inventor
El Roy L. Payne.
Attorney.

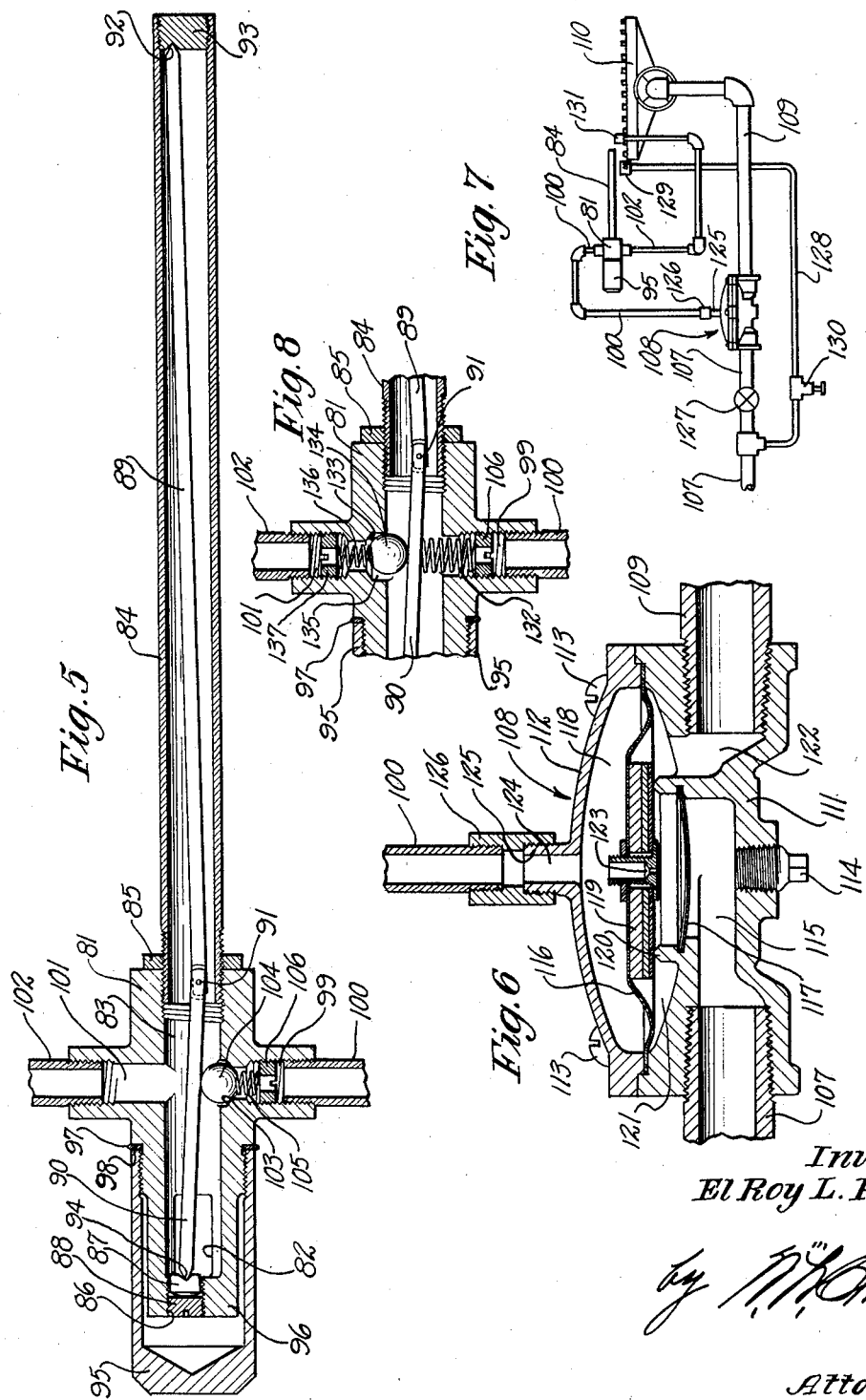

Patented Aug. 21, 1934

1,970,942

UNITED STATES PATENT OFFICE 1,970,942

THERMOSTAT CONTROL

El Roy L. Payne, Beverly Hills, Calif., assignor to Payne Furnace & Supply Company, Inc., Beverly Hills, Calif., a corporation of California Application January 3, 1933, Serial No. 649,854

4 Claims. (Cl. 297—14)

My invention relates to temperature-responsive mechanisms, with special reference to thermostats, and is directed to a novel form of thermostat adapted to control valves, electric switches, and other devices. My invention is peculiarly applicable to safety devices for controlling fuel valves, and for the purposes of this specification, will be so described. The principles of my invention, however, may be readily applied over a wide field, and no limitations are to be implied by the specific form shown below.

A thermostat of the class involved incorporates an operating member for controlling associated devices, and one or more thermal elements adapted to actuate the operating member. One object of my invention is to so interconnect the thermal member and the operating member as to multiply the effect of the thermal member as motion is translated therefrom to the operating member. A further object of my invention is to provide a construction in which two thermal members, subjected to substantially the same range in temperature, have different coefficients of thermal expansion and are arranged to actuate the operating member by their relative movement, i. e., the difference in the two coefficients of thermal expansion determines the action of the operating member.

An outstanding feature of my invention is the exceptional rapidity of thermostatic action attained by causing one of the thermal members to lag behind the other thermal member in temperature changes, even where ultimate temperatures may be approximately the same. This feature may best be explained in the detailed description to follow.

Broadly described, my invention comprises two interconnected thermal members of different coefficients of thermal expansion adapted to actuate an operating member, one of the thermal members being shielded to retard its temperature changes.

In the accompanying drawings—

Fig. 1 is a longitudinal, medial cross-section of my invention embodied in a thermostatic switch;

Fig. 2 is a perspective view of a portion of the thermostatic switch, the casing being broken to reveal certain working parts;

Fig. 3 is a diagram of a heating system incorporating the thermostatic switch;

Fig. 4 is a fragmentary, medial section, similar to Fig. 1, showing a modified form of the thermostatic switch;

Fig. 5 is a longitudinal, medial section of my invention embodied in a thermostatic valve;

Fig. 6 is a longitudinal, medial section through a diaphragm valve adapted for control by the thermostatic valve of Fig. 5;

Fig. 7 is a diagram of the rudiments of a heating system incorporating the structures shown in Figs. 5 and 6; and Fig. 8 is a fragmentary, medial cross-section, similar to Fig. 5, showing a modification of the thermostatic valve.

In Fig. 1, the thermostatic switch, generally designated 20, controls an electric circuit formed in part by two wires 21 and 22. The sides, back and top of the thermostat body 23 are covered by a casing 24 removably fixed to the body by suitable screws 25. The casing is suitably apertured to receive a non-conducting ferrule 26, through which wires 21 and 22 are introduced.

A block 27 of non-conducting material is affixed to the top of body 23 by means of suitable screws 28. Overlying a portion of block 27 is a leaf spring 29, secured at one end to the block by screws 30 and 31. Screw 31 also serves as a binding post for wire 22.

Spring 29 serves as a switch element, its free end being provided with a contact 32 positioned to meet a second contact in the form of a screw 33. A metal U-shaped yoke 34 straddling block 27 and affixed thereto by suitable screws 35, holds screw 33 spaced above block 27, a nut 36 being provided to tighten screw 33 at any desired adjustment. A set-screw 37 on yoke 34 serves as a binding post for wire 21.

It is apparent that the switch just described tends to remain open but may be closed by flexing spring 29 upward. When the switch is closed, current from wire 22 passes through spring 29, contact 32, screw 33, yoke 34 and thence to wire 21.

The immediate means of operating the switch may comprise an operating member in the form of a plunger 38 slidable in a transverse bore 39 extending through thermostat body 23 and block 27 directly under the free end of spring 29.

Body 23 of the thermostat is transversely apertured as shown at 23a and is provided with a longitudinal bore 40 threaded at the outer end for engagement with a hollow thermal member 41, preferably tubular in shape. A lock nut 42 embracing thermal member 41 may be provided to tighten such engagement. The outer end of thermal member 41 is sealed by a suitable plug 43 screwed therein.

The free or outer end of thermal member 41 is operatively connected with operating member 38 by mechanism extending through the interior of the thermal member. Preferably, this mechanism includes means to multiply the transmitted movement, such as the multiplying levers or toggle arrangement shown. A relatively long toggle arm 44, encased by thermal member 41, is pivotally connected to smaller toggle arm 45 to form knuckle 46. The outer end 47 of arm 44 is pointed and seated in a complementary recess 48 cut on the inner face of plug 43. In the same way, end 49 of shorter toggle arm 45 is pointed and seated in a suitable recess 50 cut in a plug 51. Plug 51 is slidingly housed by a bore 52 in the end of body 23, the rounded nose 53 of the plug abutting a suitable set-screw 54 in threaded engagement with the bore.

The toggle mechanism is so proportioned and adjusted that knuckle 46 falls below the alignment of recesses 48 and 50, with operating member 38 resting upon the upper side of shorter arm 45. In order to hold the parts in the position shown, with the toggle arms exerting thrusts outward towards their respective recesses, yielding means is provided to press upward against the under side of toggle arm 45 in opposition to member 38. For example, a transverse bore 55 may be provided in body 23 diametrically aligned with bore 39, bore 55 being enlarged and threaded at its outer end to receive a suitable adjustment plug 56. Plug 56 has a hollow inner end in which is seated an expansile helical spring 57 extending upward through bore 55 to press against toggle arm 45.

If thermal member 41 is heated by a flame, it is apparent that toggle arm 44 encased by the thermal member 41 will be raised to approximately the same temperature. In effect, then, toggle arm 44 is also a thermal member and in order to cause any movement of knuckle 46 should have a different coefficient of thermal expansion from that of thermal member 41. Preferably, the outer member has the greater coefficient of thermal expansion of the two. To attain the desired differential, thermal member 41 may be copper and link arm 44 fabricated of wrought iron. If the thermostat is to be directly exposed to flame, the area of outer thermal member 41 so exposed should be chromium-plated, as shown at 58, or otherwise protected to prevent undesirable reaction between the copper and products of combustion.

In the arrangement shown in Fig. 1, switch contacts 32 and 33 will be separated at relatively low temperatures, and will be brought together to electrically join wires 21 and 22 at relatively high temperatures. Such a thermostatic switch is particularly applicable to situations where it is desirable to close or open an electric circuit controlling a valve or other device.

For instance, in Fig. 3 is shown diagrammatically the rudiments of a system incorporating my invention for such purpose. Gas pipe 60, having a manually operable emergency valve 61, supplies burner 62 of a heating system. A branch 63 from pipe 60, controlled by manual valve 64, terminates in a pilot light 65 positioned to ignite burner 62. An electrically-actuated valve 66, controlled by a switch 67 at some remote station, regulates the supply of fuel to burner 62. The valve may be that shown and described in my co-pending application, filed January 3, 1933, serially numbered 649,852, and entitled "Electrically controlled valve." Such a valve has a relief pipe 68 terminating adjacent burner 62.

The control circuit for energizing valve 66 comprises a wire 69 from valve 66 to switch 67, a wire 70 from switch 67 to one terminal of battery 71, a wire 21 from the other terminal of the battery to thermostat 20, and wire 22 from thermostat 20 to valve 66. Valve 66 is constructed to take an open position when energized; and thermostat 20, with thermal element 41 exposed to the flame of pilot light 65, is arranged to close the valve-control circuit when heated, Fig. 1 showing the positions of the parts of the thermostat when cooled.

When there is no flame issuing from pilot light burner 65, thermal element 41 approximates room temperature and the thermostat switch is opened, as shown in Fig. 1. Since the control circuit is open, fuel valve 66 will not open in response to closing of control switch 67. If, however, thermal element 41 is heated by direct contact with the pilot light flame, the thermostat switch will be closed so that fuel valve 66 may be operated by remote control switch 67. The device may be adjusted by means of set screw 54 to open and close the circuit at a desired temperature.

When thermal element 41 is heated, it expands to an elongated position, but it is apparent that the inner thermal member, toggle arm 44, will also expand to an elongated position, and since the inner thermal member is in effect operatively connected with the free end of the outer thermal member, the inner free end of arm 44 at knuckle 46 will register the difference in expansion of the two thermal members. The expansion of the thermal member is translated into the toggle action that causes toggle arm 45 to pivot about recess 50, raising and lowering operating member 38.

In an arrangement such as shown in Fig. 3, it is desirable that the thermostatic switch take a closed position in a relatively short time after thermal element 41 becomes heated; and it is of even greater importance that the thermostatic switch open immediately after thermal element 41 begins to cool. The importance of the latter action, i.e., the responsiveness of the thermostat to a relatively small drop in temperature, may be appreciated by considering the conditions inside a furnace in the few minutes following immediately upon extinction of both the burner flame and the pilot-light flame. In such a case, because of heat radiated from the walls of the furnace, thermal element 41 may be but a few degrees below its normal high temperature and, unless the thermostat is adequately responsive to such a relatively small drop in temperature, it becomes possible for a person manipulating switch 67 to cause the furnace to fill with gas.

The rapid response of my thermostat as developed to meet such a situation, may be understood by considering what happens when the pilot-light is initially ignited and what happens when the pilot-light is subsequently turned off. When the flame is first applied to thermal element 41, the direct action of the flame causes the temperature of the thermal element to rise rapidly; whereas thermal element 44, being shielded from the flame, is heated indirectly at a relatively slow rate, heat passing by conduction from plug 43 to end 47 and by radiation from the inner peripheral wall of element 41. As a result, the rise in temperature of thermal element 44 lags behind the rise in temperature of thermal element 41. This lag in temperature change acts, then, to increase the movement of knuckle 46 over the extent of movement that would represent merely the difference in the two coefficients of thermal expansion.

In the same way, when the pilot light is extinguished, outer thermal element 41 cools quicker than inner thermal element 44, and the lag in temperature change of thermal element 44 hastens the movement of knuckle 46 to open the thermostat switch. Because the contraction of thermal element 44 lags behind that of thermal element 41, the thermostatic switch here shown will open in less than ten seconds after the pilot-light is extinguished.

Such a thermostatic switch may be employed in other systems where it is desirable to open a circuit instead of to close a circuit at relatively high temperatures. For instance, it may be desirable to break the control circuit to shut off the fuel feed whenever a furnace overheats. In such a case, the thermal element 41 would be inserted in the furnace away from the burner and the switch arrangement shown in Figs. 1 and 2 would be reversed, as indicated by Fig. 4, in which corresponding numbers refer to corresponding parts of the first two figures.

In this reversed form, leaf spring 73 is offset so that its free end is spaced above block 27, and said free end is provided with a downwardly disposed switch contact 74. Complementary to contact 74 is a second contact 75 thereunder, carried by metal arm 76. Arm 76 is apertured to fit around a non-conducting bushing 77, which in turn embraces one of the two screws 28. One wire 78 of the control circuit terminates at screw 31, as before, and the second wire 79 terminates at bushing 77 in electrical contact with arm 76, a non-conducting washer 80 being interposed between bushing 77 and the head of screw 28. At normal temperatures of the heater or furnace, operating member 38 drops below leaf spring 73, the parts of the thermostat being so proportioned and adjusted that whenever the furnace or heater reaches an excessively high temperature, operating member 38 will be pressed upward to separate contacts 74 and 75, thereby breaking the control circuit.

Fig. 5 shows a thermostatic valve arranged to open at relatively high temperatures and to close at relatively low temperatures. Valve body 81, having a lateral aperture 82, is provided with a longitudinal bore 83 threaded at the outer end to receive a tubular thermal member 84, a lock nut 85 being employed as before. A smaller longitudinal bore 86 communicates with the inner end of bore 83 to slidingly receive round-nosed plug 87 and to screw-threadedly receive set screw 88. The same toggle arrangement as before is employed, longer arm 89 pivotally joining shorter arm 90 to form knuckle 91, the longer arm thrusting against recess 92 in plug 93, and the shorter arm thrusting against recess 94 in plug 87. Valve body 81 is externally threaded to receive a cap 95 protecting the rear end 96 of the valve body. A fluid-tight joint between the two is attained by inserting a suitable ring gasket 97 between the cap and annular shoulder 98 of the valve body.

Fluid inlet passage 99 communicating with bore 83 is threaded for engagement with inlet pipe 100, and, similarly, outlet passage 101 is threaded for engagement with outlet pipe 102. The inner end of inlet passage 99 is shaped to a valve seat 103 for a valve in the form of ball 104, and yielding means tending continuously to unseat the valve is provided by a helical expansile spring 105 confined between the ball and an adjustment bushing 106 screw-threadedly engaging inlet 99.

The action of this thermostatic valve will be readily understood in view of the previous description of the thermostatic switch. At relatively low temperatures, both thermal element 84 and thermal element 89 are contracted to depress knuckle 91, thereby firmly seating valve 104 to prevent fluid passage through valve body 81. When the two thermal elements are heated, element 89 expands less than element 84, so that knuckle 91 is elevated to permit spring 105 to unseat valve 104. When the valve is open, spring 105 not only supports ball 104, but also exerts sufficient pressure to keep the ends of the two toggle arms seated in their respective recesses. If pipe 102 supplies a burner and thermal elements 84 and 89 are heated by a pilot light associated with that burner, no fuel will be supplied to the burner when the pilot light is out.

In many cases the fuel flow required for a burner is of greater magnitude than may be properly handled by the valve shown in Fig. 5. In such cases I contemplate employing the thermostatic valve as a relief valve to control a larger diaphragm valve in the manner shown and described in my aforesaid co-pending application. Such a diaphragm valve is shown in Fig. 6, and the rudiments of a heating system employing such a combination is indicated diagrammatically in Fig. 7.

In Figs. 6 and 7, pipe 107 conveys fuel to the diaphragm valve, generally designated by numeral 108, and pipe 109 leads from the diaphragm valve to a burner 110. Valve body 111 is provided with a top 112, removably mounted thereon by means of suitable screws 113. Body 111 is provided with a suitable plug 114 in the bottom, communicating with inlet passage 115 directly under diaphragm 116, a screen 117 spanning the inlet passage just below the diaphragm. The periphery of diaphragm 116 is secured between body 111 and cover 112 to define, with the cover, a control chamber 118. Centrally attached to the under side of the diaphragm is a laminated disk 119, which serves as a valve member acting against annular shoulder 120 to seal and unseal inlet passage 115. Annular space 121 surrounding shoulder 120 communicates with outlet passage 122 leading to pipe 109.

Control chamber 118 communicates with inlet passage 115 through a relatively small by-pass 123 in valve member 119, and is provided with a relatively large relief passage 124 extending through a nipple 125 integral with cover 112. By means of pipe 100 connected to nipple 125 by sleeve 126, relief passage 124 of diaphragm valve 108 communicates with the valve shown in Fig. 5, which valve, therefore, serves as a relief valve for the operation of the larger diaphragm valve.

In Fig. 7, a valve conventionally shown at 127, controlling fuel passage through pipe 107, may be either a manually operable valve or a remotely controlled valve. A branch 128 from pipe 107 feeds a pilot burner 129 which is controlled by a suitable valve 130. Pipe 100 interconnects diaphragm valve 108 and body 81 of the thermostat valve, as previously noted, and pipe 102, leading to a small auxiliary burner 131, discharges gas from the relief valve near burner 110.

Assume pilot-light 129 to be burning and maintaining the thermal elements of the thermostatic relief valve at a relatively high temperature. The relief valve will, in such case, be open; and if control valve 127 is open the fuel stream entering diaphragm valve 108 will keep valve member 119 unseated and fuel will pass readily to burner 110. The relatively large relief passage being open, will prevent any effective pressure being built up in control chamber 118.

Assume the pilot-light flame to be extinguished, and control valve 127 to be closed. The thermal members being relatively cold, the thermostatic relief valve will be closed. If, now, control valve 127 be opened, gas entering diaphragm valve 108 will not pass freely to pipe 109, because gas entering control chamber 118 through by-pass 123 will build up a preponderance of pressure on the upper side of the diaphragm to result in seating valve member 119 to seal inlet passage 115. It is apparent that the arrangement shown in Fig. 7 has the same basic features as the arrangement shown in Fig. 3, but accomplishes the desired end mechanically without involving an electric circuit.

It may be desirable to have the relief valve open at relatively low temperatures and to close at relatively high temperatures. Such a valve, for example, would be required in arrangements previously described with reference to the thermostatic switch of Fig. 4. For such purpose, the action of the thermostatic valve shown in Fig. 5 may be reversed by structural modifications indicated in Fig. 8, corresponding numbers indicating corresponding parts. In this form, spring 105 is replaced by a larger spring 132 pressing upward against the under side of toggle arm 90. The inner end of outlet passage 101 is formed to a valve seat 133 complementary to valve ball 134. These parts are so proportioned and arranged that when the thermal members are relatively cool, with knuckle 91 depressed, ball 134 drops away from seat 133 into the enlarged inner portion 135 of passage 101, the ball resting on the upper surface of toggle arm 90. To facilitate the opening of the valve, an expansile helical spring 136 may be placed in outlet passage 101 under compression between ball 134 and adjustment bushing 137. When the temperature of the thermal members is increased to an excessive degree, ball 134 will be forced into its seat to prevent flow of fluid through passage 101.

For the purpose of completely disclosing my invention, and of illustrating the principles involved, I have described specific forms in specific detail; but my invention may be widely modified, and I reserve the right to all modifications and changes that properly come within the purview of my appended claims.

Having described my invention, I claim:

1. A thermostat having, in combination: a body; a thermal responsive member mounted by one end to the body, said member having a relatively high coefficient of thermal expansion; yielding means associated with the body; a pair of toggle-arms confined at one end by the body, at the other end by the free end of the thermal member, and at an intermediate point by said yielding means pressing in a direction to extend the toggle-arms, said arms having a relatively low coefficient of thermal expansion; and an operating member movably mounted in said body in a position to be actuated by said toggle-arms.

2. A thermostat having, in combination: a body; a thermal-responsive member mounted by one end to the body, said member having a relatively high coefficient of thermal expansion; a pair of toggle links confined at one end by said body and at the other end by the free end of said member; yielding means disposed laterally of the toggle arms and pressing against one of the arms to resist lateral movement thereof in opposition to the effect of movements of the free end of the thermal-responsive member; and an operating member disposed laterally of and in contact with one of the toggle arms to be actuated by lateral movements thereof.

3. A thermostatic control device having, in combination: a thermal-responsive hollow member having a free end; a pair of toggle links having one end fixed and one end extending into such member, said second end being variably restrained by the free end of the thermal-responsive member, said links having a relatively low coefficient of thermal expansion; yielding means exerting a lateral force against the pair of links component to thrusts from the two ends of the pair of links; and an operating member in contact with said pair of links, adapted to be actuated by lateral movements thereof.

4. A thermostatic control device having, in combination: a thermal-responsive hollow member having a free end; a toggle linkage having one end fixed and one end extending into such member, said second end being variably restrained by the free end of the thermal-responsive member, said linkage having a relatively low coefficient of thermal expansion; yielding means exerting a lateral force against the toggle linkage component to the thrusts of the two ends of the toggle linkage; an operating member in contact with the toggle linkage in a lateral position to oppose said yielding means; and a second yielding means weaker than the first-named yielding means, said second yielding means urging the operating member against the linkage in opposition to the first-named yielding means.

EL ROY L. PAYNE.